United States Patent [19]

Smith

[11] 4,141,824
[45] Feb. 27, 1979

[54] TANGENTIALLY FED UPFLOW SAND FILTER METHOD AND APPARATUS

[75] Inventor: Carl K. Smith, Mathis, Tex.

[73] Assignee: Midcon Pipeline Equipment Co., Houston, Tex.

[21] Appl. No.: 845,341

[22] Filed: Oct. 25, 1977

[51] Int. Cl.$^2$ .................... C02C 1/04; B01D 29/36
[52] U.S. Cl. .................................. 210/17; 210/18; 210/52; 210/80; 210/82; 210/203; 210/218; 210/266
[58] Field of Search .................. 210/17, 51, 52, 53, 210/80, 82, 203, 170, 204, 209, 218, 275, 283, 284, 290, 333, 333.1, 340, 341, 512 R, 18, 278; 175/72, 65; 252/8.5 A, 8.5 B

[56] References Cited

U.S. PATENT DOCUMENTS

| | | | |
|---|---|---|---|
| Re. 27,163 | 8/1971 | Asper | 210/333.1 |
| 2,083,183 | 6/1937 | Adams | 210/333.1 |
| 2,180,811 | 11/1939 | King | 210/512 R |
| 2,468,603 | 4/1949 | Pew | 210/340 |
| 2,570,132 | 10/1951 | Koupal | 210/340 |
| 2,954,872 | 10/1960 | Liddell | 210/333.1 |
| 3,006,475 | 10/1961 | Wood | 210/512 R |
| 3,056,499 | 10/1962 | Liddell | 210/333.1 |
| 3,171,804 | 3/1965 | Rice | 210/51 |
| 3,285,849 | 11/1966 | Watanabe | 210/53 |
| 3,306,447 | 2/1967 | Medeiros | 210/170 |
| 3,392,833 | 7/1968 | Baillie | 210/170 |
| 3,441,503 | 4/1969 | Smith | 210/278 |
| 3,458,436 | 7/1969 | Martinola | 210/275 |
| 3,600,307 | 8/1971 | Kehoe | 210/80 |
| 3,651,942 | 3/1972 | Berardi | 210/203 |
| 3,816,308 | 6/1974 | Le Blanc | 210/51 |
| 3,835,039 | 9/1974 | Ciambrone | 210/17 |
| 3,855,120 | 12/1974 | Garbo | 210/17 |
| 3,975,266 | 8/1976 | Baize | 210/52 |
| 3,977,970 | 8/1976 | Willis | 210/80 |
| 3,996,015 | 12/1976 | Hutchings | 210/512 R |
| 4,021,338 | 5/1977 | Harkin | 210/18 |
| 4,075,095 | 2/1978 | Parnaby | 210/82 |

OTHER PUBLICATIONS

Composition and Properties of Oil Well Drillings, Rodgers, Gulf Publishing Co., Texas, 1953, pp. 146-150.

*Primary Examiner*—Charles N. Hart
*Assistant Examiner*—Ernest G. Therkorn
*Attorney, Agent, or Firm*—Carl B. Fox, Jr.

[57] ABSTRACT

Methods and apparatus for purifying water by filtration, according to which water is passed in an upward direction through one or more sand beds supported in towers, at a slow rate of flow so that the sand bed is not disturbed. The sand bed or layer is relatively deep vertically to provide superior filtration. Raw water feed to each tower is accomplished by tangential flow from the inlets. Rapid backwash of the sand bed is accomplished by opening a dump valve at the lower end of a cone provided at the base of the tower in which the sand bed is supported. Maintenance and control of bacterial activity in the lower part of the sand bed enhances purification of the water by bacterial action. Chemical treatments of the water may be used in conjuction with the filtration, including treatments with chlorine, and with alum (i.e. aluminum sulphate and/or potassium or ammonium alum) to produce a floc, and barium sulphate and/or a drilling mud may be added to assist in removal of the floc by filtration.

25 Claims, 7 Drawing Figures

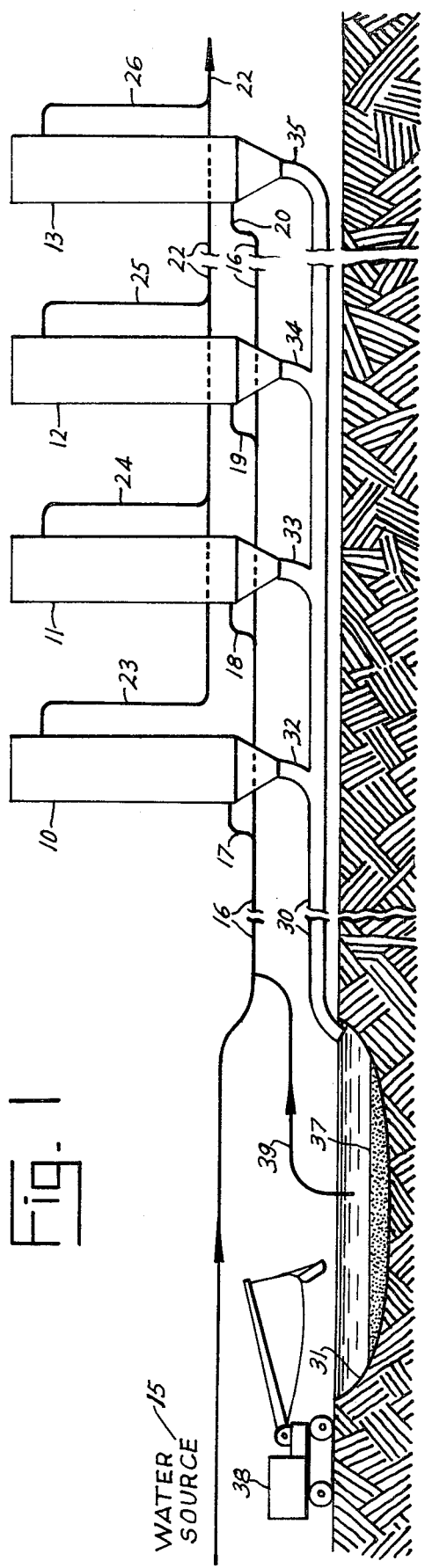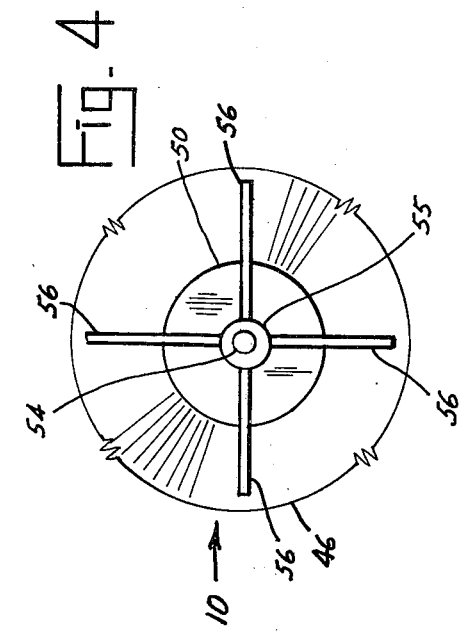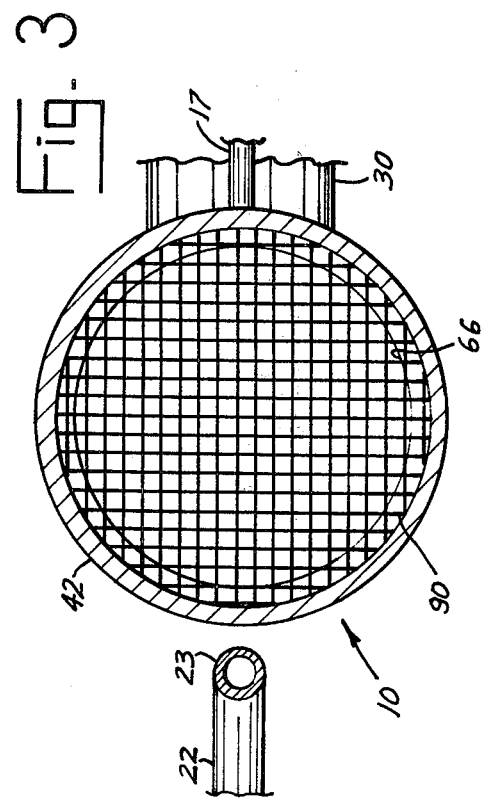

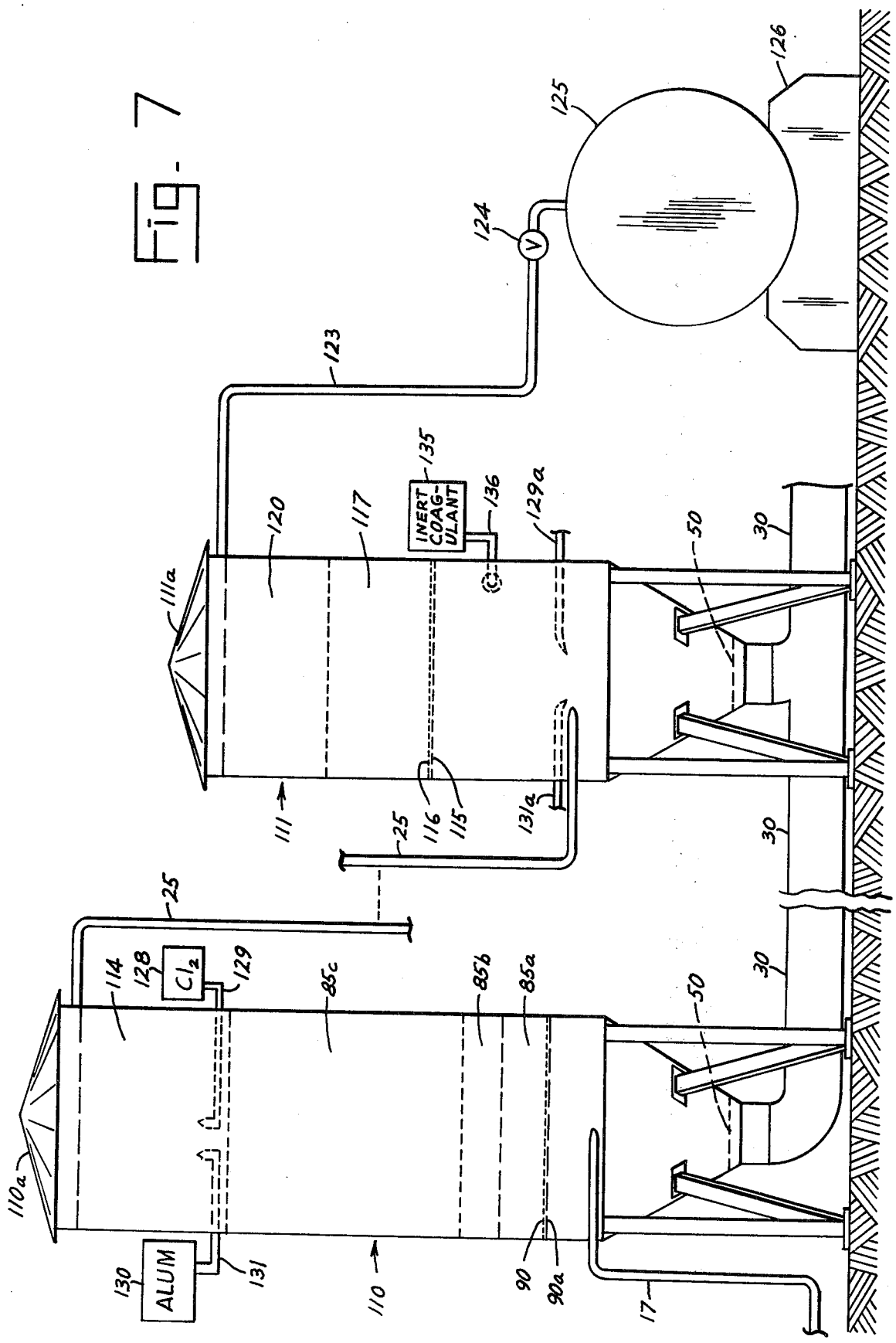

TANGENTIALLY FED UPFLOW SAND FILTER METHOD AND APPARATUS

BACKGROUND OF THE INVENTION

Filtration treatment of water for purification by present methods is a troublesome operation. Water is usually fed onto the upper surface of a relatively shallow sand bed, and filtered water is withdrawn from the bottom of the sand bed. The upper portion of the sand bed becomes plugged with the solid materials removed from the water and with algae and other organic materials. The bacterial activity in the sand bed can be only partially controlled, if at all. The filtration rate drops off because of the plugging and contamination of the bed, and the bed must be cleaned and reconditioned, usually by removal of the upper surface of the sand and replacement with fresh sand. Backwashing in the required upward direction can be done only in a very limited manner because of the large amount of backwash water which would be required in view of the large horizontal areas of the beds to obtain a high upward backwash water flow rate.

SUMMARY OF THE INVENTION

According to the methods and apparatuses according to the invention, a sand bed of relatively deep vertical extent is supported in a tower or tank, and water is flowed upward through the tower for filtration and purification. The lower end of the tower is conical, and the water feed is introduced to the upper end of the cone tangentially, which distributes the water over the tower area and assists in separating out the larger solid content of the water. The solids separated in this manner sink to the bottom of the cone to be out of the path of the incoming water. The sand bed is supported on a bed or layer of gravel which is supported on a screen adjacent the upper end of the conical bottom of the tower, just above the water feed manifold ring which is disposed around the periphery of the tower.

A dump valve is provided at the lower end of the cone. The dump valve is opened periodically to backwash the sand bed by gravity downflow of the water filling the tower. The backwash performed in this manner is very rapid and effective, as the dump valve outlet is large enough that the entire volume of water in the tower "falls" from the tower very quickly at a high flow rate, flushing practically all solid contamination from the lower part of the sand bed at a high and turbulent rate of flow. The entire backwash operation can be accomplished in a matter of minutes, as compared with the hours or days required for backwashing the conventional sand bed used for water filtration. This makes it possible to economically backwash at fairly frequent intervals, so that the bed may be maintained in relatively clean condition at all times.

The backwash water is preferably fed into a pond or other storage facility for settling out of the solids contained therein. The larger solids which were separated from the feed water in the cone are washed out of the cone with the backwash to be carried to the pond with the solids collected by the sand bed. A proportion of the bacterial growth in the base of the sand bed is carried out with the backwash, which assists in preventing overgrowth of the bacteria, a frequent problem in the case of conventional sand bed filtration systems. Clarified water from the pond can be recirculated to the tower. Since the pond water will contain bacteria previously flushed from the sand bed, the amount of bacteria in the sand bed can be increased in this manner if desired. The bacterial content of the pond water can be controlled by chlorination to decrease the content, and by addition of bacteria. Other method of control of bacteria in the pond water and in the sand bed known in the art may be used with the invention.

The feed water introduced tangentially at the base of the sand bed is flowed upward through the sand bed at a relatively slow flow rate, preferably not exceeding six inches per minute upward through the tower. Under certain conditions, rates exceeding six inches per minute may be employed. But care should be taken that the sand bed is not unduly disturbed by the upward water flow. The slow upward water rate prevents channeling through the sand bed, common in conventional systems, and enhances filtration efficiency. Flow rates slower than six inches per minute reduce plant capacity and increase costs.

The bacteria used in sand filtration systems for water purification are aerobic bacteria. Exposure of the bacteria to plentiful air or oxygen supplies is what primarily causes the overgrowth previously mentioned. Shutting off air supply to open sand beds as in conventional filtration systems is impossible to achieve. But according to the herein presented methods and apparatuses, the oxgyen level at the sand bed can be readily controlled, with resultant control of the growth of the aerobic bacteria.

The chlorine and alum treatments mentioned above are useful in reducing bacteria count and turbidity of the water, and the use of barium sulfate and/or drilling mud simplifies removal of the floc.

A principal object of the invention is to provide improved sand filtrations methods and apparatuses for water clarification and purification. Another object of the invention is to provide such methods and apparatuses which are efficient and economical. Another object of the invention is to provide such methods and apparatuses which are capable of substantially continuous operation. Yet another object of the invention is to provide such methods and apparatuses utilizing upward water flow through one or more sand beds at a slow rate, and fast downflow of water for sand bed cleaning and revitalization. A further object of the invention is to provide such methods and apparatuses wherein bacterial growth may be controlled and maintained. A still further object of the invention is to provide such methods and apparatuses utilizing a settling pond system for solid separation and backwash water recirculation, and for bacterial control. Another object of the invention is to provide such methods and apparatuses including the use of chlorine, and the use of alum to produce a floc, and the use of barium sulphate or drilling mud to simplify removal of the floc by filtration. Another important object of the invention is to provide such methods and apparatuses wherein backwashing of the sand bed is rapidly accomplished and wherein downtime is minimized.

BRIEF DESCRIPTIONS OF THE DRAWINGS

FIG. 1 is a schematic drawing showing the methods and apparatus arrangement in a preferred embodiment according to the invention.

FIG. 3 is a horizontal cross section taken at line 3—3 of FIG. 2.

FIG. 4 is a horizontal cross section taken at line 4—4 of FIG. 2.

FIG. 7 is a schematic drawing showing modified embodiments of the method and apparatus.

DESCRIPTIONS OF THE PREFERRED EMBODIMENTS

Figure 2:
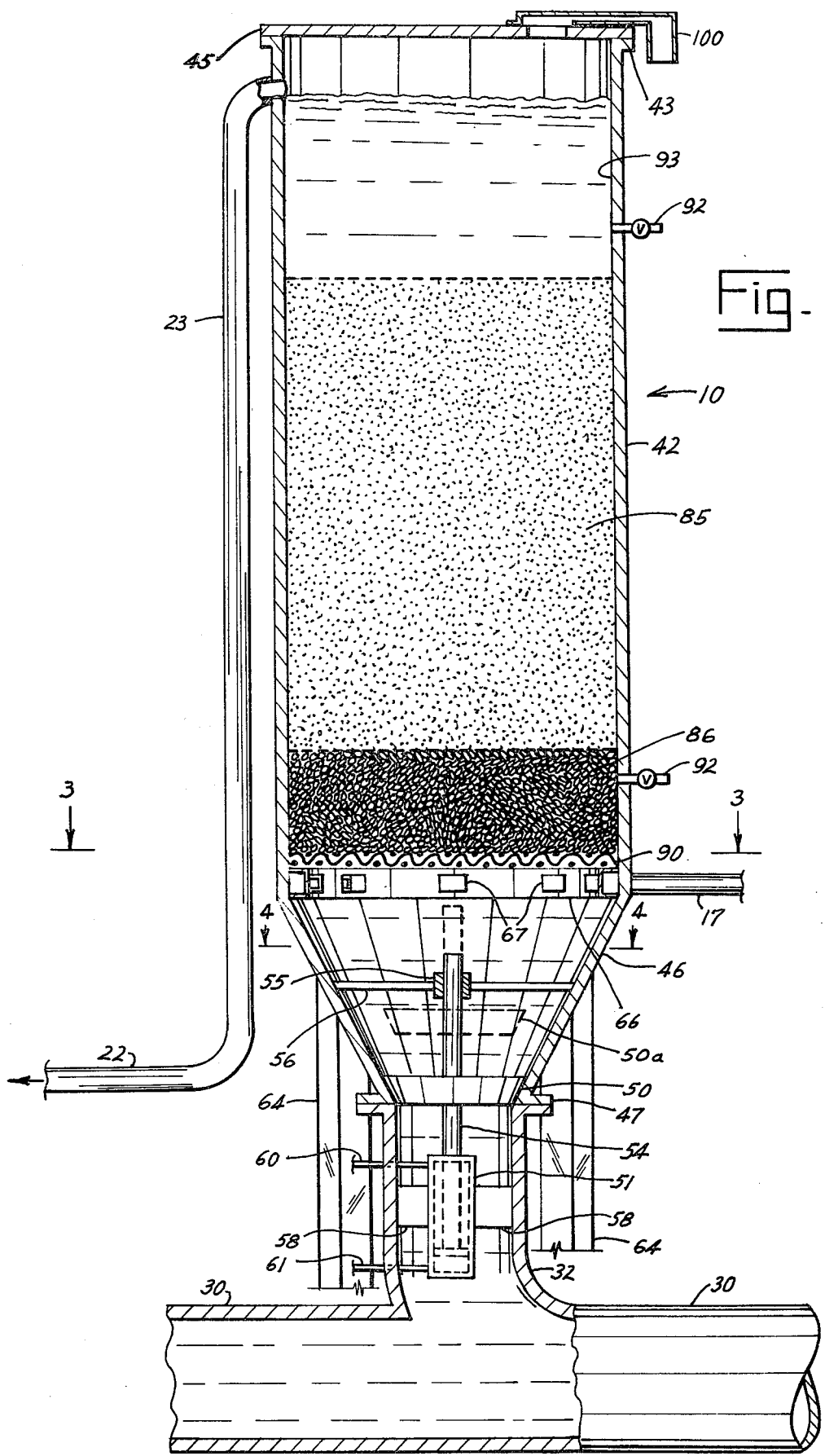
FIG. 2 is a vertical axial cross section of an apparatus element of preferred form according to the invention.
Figure 5:
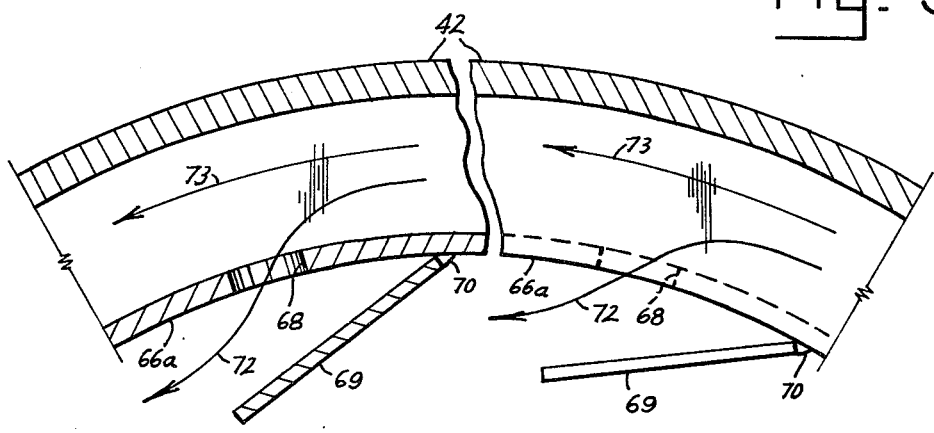
FIG. 5 is a top view, partly in elevation and partly in horizontal cross section, showing a water inlet of the apparatus of FIG. 2.
Figure 6:
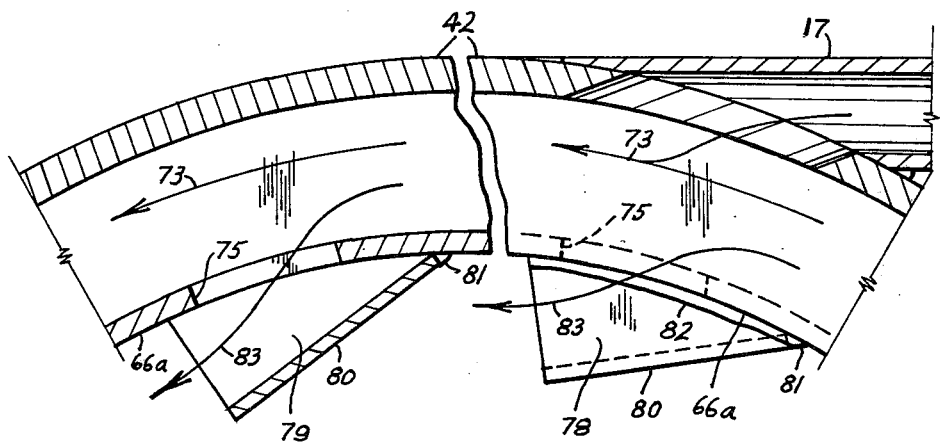
FIG. 6 is a top view, partly in elevation and partly in horizontal cross section, showing a modified form of water inlet for the apparatus of FIG. 2.

Referring now to the drawings in detail, the first to FIG. 1, there is shown a preferred installation of apparatus for carrying out the methods of the invention. A plurality of vertical towers or tanks 10-13 each contains a sand bed through which water is percolated upwardly for filtration of inorganic and organic solid matter from the water, and to treat the water by bacterial action. The water is delivered to towers 10-13 from a suitable source 15 through pipeline 16. Branch pipes 17-20 connect the pipeline 16 to the towers. Filtered and treated water is delivered through pipeline 22 to a suitable receiver or piping system for storage or use of the water. Branch pipes 23-26 connect the upper portions of the towers to pipeline 22, as shown.

For simplicity, elements such as valves, pumps, pressure gauges, and the like, are omitted from the drawings. It will be realized that flows to and from the water source and towers will be controlled by conventional valves, and that pumps must be provided as necessary to cause proper flow of the water, and that evaluation of system pressure might be useful in the operation of the plant, but these elements are conventional and may be provided as necessary by the skilled practitioner in the art. Flow meters may also be provided as desired or required for proper plant operation in conventional manner.

Backwashing of the sand beds in towers 10-13 is accomplished by shutting off the water feed to the particular tower and opening a dump valve at the base of the tower. The water filling the tower drops out of the tower rapidly, backwashing the sand bed, and is flowed through a pipeline 30 to a pond 31, or other suitable receptacle for the water. If certain features of the invention involving use of the pond or other suitable receptacle are not desired to be used, the backwash water may be disposed of in any suitable manner. Branch pipes 32-35 connect the bottoms of the towers to pipeline 30, as shown.

In pond 31, the solids contained in the backwash water are allowed to settle, forming a layer 37 in the bottom of the pond, and may be removed continually or periodically by a dragline 38 or other suitable device or system. A thickener apparatus may be used instead of the pond as shown. The clarified water in the upper portion of the pond may be recirculated to the towers through a pipeline 39, a suitable pump being necessary for this purpose.

Referring now also to FIGS. 2-6 of the drawings, any number of the towers 10-13 may be used. In small water purification systems a single tower may be all that is required. In large systems, a large number of towers may be employed. In any system, it is preferred that at least two towers be used so that even short interruptions of water output caused by periodic backwashing will not occur.

The towers may be of any suitable diameter, but because of the problems which would likely be encountered in the case of towers of excessively large diameter, it is preferred that the towers be of relatively small diameter, for example, fifty feet diameter or less. The towers may be of any suitable height, but it is preferred that the towers be of heights of the order of thirty feet so that sand beds of sufficient depths, say, fifteen to twenty feet, may be provided. If sand beds of less depth are used, the degree of water purification will suffer, and if beds of considerably greater depth are used, excessive pumping pressures will be encountered without great benefaction of the water purity. For most water purification plants, towers of ten to twenty feet diameter and thirty feet in height will be preferred.

The tower 10 is shown in FIG. 2, towers 11-13 being identical and the description of tower 10 applying equally thereto. Tower 10 has circular side wall 42 having flange 43 around its upper end. Circular top 45 closes the top of the tower, and is bolted or clamped in place in conventional manner by means not shown. Tower 10 is conical at its lower end portion 46, a flange 47 being provided around the lower end of portion 46. Flange 47 is connected to flange 48 around the end of branch pipe 32 by bolts, not shown.

A valve 50 of conical form around its sides is seated within the lower end of conical tower formation 46 to close the lower end of the tower, and may be moved to an elevated position 50a to open the lower end of the tower to permit fluid flow by gravity from the tower. Valve 50 is actuated to open and close by pneumatic or hydraulic cylinder 51, an air cylinder being preferred. Shaft 54 of cylinder 51 is fixed through a fitted opening through valve 50, the shaft extending above the valve slidably through a support collar 55 held in place by plural circularly spaced radial braces 56. Cylinder 51 is supported by a plurality of brackets 58 spaced therearound, the brackets being in the form of vertical plates affixed to the cylinder at their inner sides and welded to the wall of branch pipe 32 at their outer sides. When the cylinder shaft 54 is retracted, valve 50 is closed, and when shaft 54 is extended, valve 50 is opened. Fluid for operation of cylinder 51 is supplied from a suitable source of pressured fluid through tubes 60, 61.

Tower 10 is supported on a suitable foundation, not shown, by plural spaced columns or legs 64, in conventional manner. Suitable cross braces for the legs, not shown, may be provided.

Feed water branch pipe 17 is sealedly fixed through the tower wall, preferably tangentially, by welding, and communicates with the interior of a circular manifold 66. Manifold 66 is in the form of a circular trough or channel open around its outer side, and its upper and lower walls are welded to the tower wall therearound to form an enclosed circular water flow passage around the interior side of the tower wall. A plurality of circularly spaced tangential water outlets 67 are provided around the inner side of the manifold. The water outlets are shown in tow forms in FIGS. 5 and 6. In the FIG. 5 form of the outlets, a hole 68 is provided through the interior wall 66a of manifold 66 for each outlet, and a water-directing rectangular plate 69 is welded to wall 66a at 70, at an angle to wall 66a of manifold 66 for each outlet, and a water-directing rectangular plate 69 is welded to wall 66a at 70, at an angle to wall 66a to direct the inflowing water tangentially as indicated by arrow 72, the flow direction of the water in manifold 66 being indicated by arrow 73. In the FIG. 6 form of the water outlets 67, a hole 75 of rectangular shape is provided through wall 66a and is covered by an open ended water-directing fitting 77 having upper wall 78, lower wall 79, and angular inner wall 80. The fitting is connected to wall 66a over the opening 75 by welding round its edges as at 81, 82. The tangential incoming water flow direction is indicated by arrow 83, the manifold water flow direction again being indicated by arrow 73.

The tangential, or peripheral, incoming water flow direction assists in the separation of larger solid matter from the incoming water, the larger particales of sand, or other solid, being thrown into contact with the cone wall and sliding down to the bottom of the cone, and also assists in the prevention of channeled water flow up the tower through the sand bed. The incoming water at the periphery tends to squeeze the water at the center upwardly into the sand bed uniformly over the tower area, thereby preventing channeled flow upward above the water inlets.

The sand bed 85 is supported by a bed or layer of gravel 86, which in turn is supported by a screen 90. Screen 90 may be of any suitable construction to support the gravel and sand beds and to permit upflow of water over its area. Expanded metal screens of sufficiently heavy gage may be used, as well as screens fabricated of welding together rods or bars. Cross beams to support the screen, and other supports, may be provided as necessary.

As mentioned earlier, water is introduced through manifold 66 and water inlets 67 at a rate to produce an upflow water rise of about six inches per minute. Water flows both higher and lower than this may be used. Valve 50 being closed, the water first fills cone 46 and then rises through the gravel and sand beds. Valve controlled air outlets 92 may be provided at any necessary locations to enable filling of the tower with water if top 45 is sealed and branch pipe 23 is closed. The water continues to rise up to the outlet of pipe 23, and then flows out through pipe 23. A vertical space 93 within the tower and between the upper level of the sand bed and the outlet of pipe 23 is provided to enable settling of any sand from the sand bed which may be carried up by the rising water. The water outflowed through pipe 23 is carried by pipeline 22 for storage or use.

Materials filtered from the water collect in the lower part of the sand bed and in the gravel and must periodically be removed by backwashing the beds. For backwashing, the feed water input through pipe 17 is shut off and valve 50 is opened by operation of cylinder 51. The water in the tower rushes downward, backwashing the sand and gravel beds, and exits to pond 31 through branch pipe 32 and pipeline 30. Such solid matter as has collected in the lower part of cone 46 is flushed out with the water. Drains 30 and 32 are large enough that the tower is emptied in a very few minutes. The tower top 45 is provided with an air inlet, or vent, 100 of large capacity so that the water may drain from the tower without creating a vacuum in the upper part of the tower.

As has earlier been described, bacteria build up on the lower section of the sand bed 85. The bacteria assist in achieving good filtration and the bacterial activity assists in water purification. Overgrowth of bacteria can plug a sand bed and decrease filtration capacity if uncontrolled. Since bacterial overgrowth results primarily in situations where oxygen is in abundent supply, bacterial overgrowth is not likely to occur in the herein disclosed system, wherein the part of the sand bed first contacted by the incoming water is completely enclosed. The level of bacteria in the water in pond 31 may be controlled by chlorination or other chemical treatment to reduce bacterial growth, or by addition of bacteria, and this water may be recirculated as necessary to control the level of bacteria in the sand bed as well as to recover the backwash water. Chlorine or other chemical treatment may be added to the incoming water to one or all of the towers 10-13 to control the bacteria in the sand beds. The solids from the backwash water which settle in pond 31 may be dug out by means of a dragline 38 or other suitable implement and disposed of as desired.

The sand bed backwashing provided according to the invention is much more complete than can be accomplished in conventional ponds wherein the water must be upflowed through a large area bed by pumping. The present system uses a much smaller volume of backwash water to do a superior job of backwashing. No sand must be removed and replaced for sand bed rejuvination according to the invention. While sand bed backwashing and rejuvination may take days or weeks with conventional filtration systems, the backwash operation as herein described requires only a few minutes for completion. Backwashing may be done as often as necessary to maintain the bed or beds in good condition, without excessive downtime or cost.

The towers 10-13 may be constructed of steel plate and lined with coal tar to prevent corrosion and discoloration of the water. The screen 90 may be constructed of steel and coated with a material such as 70B-1A Waterworks Enamel. The sand for the sand beds may be of conventional types and sizes used in other sand filtration systems.

As an example of operation of a system as herein described, a pilot plant included two towers each ten feet in diameter and thirty feet high. The sand beds in the towers were each of a depth of sixteen feet of waterworks filtration grade sand supported on gravel beds tow feet in depth. River water was fed into the towers at a rate of 300 gallons per minute for each tower, the purified water exiting at the same rate of flow. Bacteria buildup proceeded normally and was periodically reduced by addition of small amounts of chlorine added to recycled backwash water. In two months of operation, results were entirely satisfactory, the output water being clear and of satisfactory city water supply purity. Backwashing of the towers was done at approximate twelve hour intervals, requiring approximately twenty minutes per backwash operation, and no plugging of either tower occurred. No carryover of sand from the beds occurred, and when the water flow rate per tower was increased to nine hundred gallons per minute no sand carryover occurred but some decrease in water purity was observed.

Referring now to FIG. 7 of the drawings, there are shown schematically modified forms of the method and apparatus. In FIG. 7, the tower 110 is, except for differences to be described, the same as towers 10-13, previously described, and the same reference numerals identify the elements which are the same. Tower 110 has a conical top or cover 110a, instead of having a flat top or cover. Tower 111 is also generally the same as the other towers, but is of lesser height as shown, and has a conical top 111a. Water to be purified and treated is flowed through one or more towers 110 and then through one or more towers 111.

Untreated water enters tower 110 through pipe 17, being introduced into the upper part of cone 46 tangentially, as before. Larger solids in the water settle to the bottom of the cone. The water rises upwardly through bed supporting grid 90a and screen 90 and through bed layers 85a, 85b, and 85c of successively finer grades of gravel and sand. Above bed layer 85c, the water rises through free tower zone 114 to outlet pipe 25, where the water overflows from the tower.

Pipe 25 may lead to another tower 110, or it may lead to tower 111. In other words, there may be one, two, or more towers 110 in series, with water from the last of these being introduced into tower 111. There may also be one, two, or more towers 111 in series.

Tower 111 has a grid 115 supporting a screen 116 on which is supported a sand bed 117. The grid 115 and screen 116 are at a higher level then grid 90a and screen 90 of tower 110, providing an uninterrupted water space 119 beneath grid 115. Water entering tower 111 through pipe 25 passes upwardly through space 119, grid 115, screen 116, and sand bed 117 into free water space 120, and then overflows from tower 111 through outlet pipe 123. Valve 124 in pipe 123 is kept open during plant operation, permitting the water to flow into storage or surge tank 125, which is supported by one or more supports 126. Plural interconnected tanks 125 may be provided, or the water may be delivered directly into a water pipeline or distribution system.

A suitable chlorine feeding apparatus 128 and injection pipe 129 are provided to introduce chlorine into the water in free space 114 of tower 110. The chlorine may be introduced as a gas or in liquid or solution form, or in any other manner known in the art. A suitable alum feeding apparatus 130 and injection pipe 131 are also provided to introduce alum in any suitable form for introduction into the water in space 114. The chlorine controls bacteria in the water. The alum, which may be aluminium sulphate and/or another alum such as potassium alum or ammonium alum, reacts with materials which produce alkalinity in the water (e.g. $Ca(HCO_3)_2$ and $CaSO_4$) to produce a voluminous floc in the water. The floc is filtered from the water by bed 117 in tower 111, effectively removing turbidity and conditions causing turbidity from the water. The resultant water is pure, clear and palatable, and of very high quality for substantially any use.

Alternatively, the chlorine may be added in space 119 of tower 111, through an injection pipe 129a, and the alum may alternatively be added through an injection pipe 131a at the same location.

To assist in the filtration of the floc from the water by sand bed 117, a solid material in subdivided form such as barium sulphate or a suitable drilling mud may be added to the water by feeder 135 and injection device 136. These materials are added preferably as water suspensions, and preferably in a swirling direction along an arc of the circular tower cross section. The barium sulphate or drilling mud serves as a filter aid to prevent plugging of the sand bed by the floc. These materials also serve to coagulate the floc so that a substantial proportion of the floc will settle out of the water into the bottom of cone 46 of tower 111.

The water rise rates in towers 110, 111 are the same as earlier described, in order that the sand beds will not be disturbed and in order that settling of solids into the tower cones may occur. Dumping of the solids collected in the tower cones and backwashing of the sand beds is accomplished in the same manner as has already been described, by shutting off such water flows as are necessary and opening of the dump valve 50 provided at the bottom outlet of each tower.

The chemical treatments described in connection with towers 110, 111 may be used, but less satisfactorily, in the towers 10.

While preferred embodiments of the methods and apparatus have been described and shown in the drawings, many modifications thereof may be made by a person skilled in the art without departing from the spirit of the invention, and it is intended to protect by Letters Patent all forms of the invention falling within the scope of the following claims.

I claim:

1. Method for purifying water, comprising introducing water tangentially into a water introduction zone immediately beneath the bottom of a sand bed of circular horizontal cross section to uniformly distribute the water beneath the sand bed and to throw relatively larger solids from the introduced water toward the sides of said zone, maintaining a body of water in a space beneath said zone which is maintained in swirling motion by the introduced water and through which said relatively larger solids settle while being continuously thrown outwardly by said swirling motion, passing water upwardly from said zone through said sand bed at a uniform upward speed of about six inches per minute, passing the water exiting from the top of the sand bed upwardly through a settling chamber above the sand bed to remove any suspended sand particles therefrom, and withdrawing purified water from the upper portion of said settling chamber.

2. Method according to claim 1, including stopping introduction of water to said zone, and rapidly draining the water from said space, and draining the water from said zone and sand bed and settling chamber through said space to backwash said sandbed and to flush said relatively larger solids from said space, and then closing said space against further drainage therefrom and resuming introduction of water to said zone.

3. Method according to claim 2, including clarifying said water drained from and through said space by settling solid materials therefrom, and returning the clarified water to said zone.

4. Method according to claim 2, including controlling the level of aerobic bacteria in said sand bed and in said receptacle.

5. Method according to claim 4, said sand bed being supported in a vertical tower having said space within a conical bottom having a relatively large valve at its lower end.

6. Method according to claim 1, including passing the water withdrawn from said settling chamber to beneath a second sand bed having a said zone and space thereabove and a said settling chamber thereabove, and passing the water upwardly through the second sand bed in the manner described and withdrawing further purified water from the upper portion of the settling chamber above said second sand bed.

7. Method according to claim 6, including stopping introduction of water to said zone beneath each said sand bed, and rapidly draining the water from said respective spaces, and draining the water from said respective zones and sand beds and settling chamber to backwash said sand beds and to flush said relatively larger solids from said spaces, and then closing said spaces against further drainage therefrom and resuming introduction of water to said zones.

8. Method according to claim 7, including adding alum, chlorine and inert coagulant to the water after it has passed upwardly through said first-named sand bed and before it is passed upwardly through said second sand bed.

9. Method according to claim 1, including a plurality of said sand beds and separately passing feed streams of water to each and withdrawing the purified water and backwashing the sand beds at different intervals whereby a continuous withdrawal of purified water is obtained.

10. Method according to claim 1, including adding alum to the purified water to precipitate alkaline constituants from the water as a floc, filtering the floc by causing the water to flow upwardly through an additional sand bed, withdrawing the water from the top of the additional sand bed, periodically shutting off upward flow of water through the additional sand bed and rapidly dropping the water in the additional sand bed to backwash the additional sand bed.

11. Method according to claim 10, including adding an inert solid coagulating agent to the water before the water is flowed upwardly through the additional sand bed to coagulate the floc to assist in removal of the floc from the water.

12. Method according to claim 11, said inert solid coagulating agent being subdivided barium sulphate.

13. Method according to claim 11, said inert solid coagulating agent being drilling mud solids.

14. Method according to claim 10, including adding chlorine to said purified water to control bacteria content thereof.

15. Water purification system, comprising vertical tower means, support means spaced above the bottom of said tower means for supporting a bed of sand, a bed of sand disposed upon said support means and extending to an upper level spaced below the top of said tower means to provide a settling chamber above said bed of sand, water introduction means for introducing unpurified water tangentially into said tower means into a water introduction zone beneath said bed of sand, said tower means having a space beneath said zone water within which is swirled by the introduced water to throw relatively larger solids toward its outer periphery, water outlet means for draining purified water from the upper portion of said settling chamber, air inlet means at the top of said tower means, water drain means at the bottom of said space including means for delivering the water drained therethrough to receptacle means, valve means for controlling water flow through said drain means, and means for recirculating water from said receptacle means to said water introduction means.

16. The combination of claim 15, said tower means comprising a closed vertical tank.

17. The combination of claim 16, said space being conical and being downwardly convergent, said drain means being connected to the lower end of said conical space and said valve means being disposed at the inlet to said drain means.

18. The combination of claim 17, said valve means comprising a quick-opening valve.

19. The combination of claim 17, said water introduction means comprising a manifold around the periphery of said tower means adjacently below said support means and including means for directing the water tangentically into said tower means.

20. The combination of claim 17, said valve means comprising a frustoconical valve sealingly seatable in the lower end of said space, and fluid actuated means for moving said valve between a closed position against said lower end of said space and an opened position above said lower end of said space.

21. The combination of claim 16, said tank being of circular horizontal cross section.

22. The combination of claim 15, said bed of sand being at least ten feet in depth.

23. The combination of claim 22, said bed of sand being between ten and twenty feet in depth.

24. The combination of claim 15, said water introduction means introducing water into said zone at a rate equivalent to a rise of water in said tower means of between two inches per minute and thirty-six inches per minute.

25. The combination of claim 15, said water introduction means introducing water into said zone at a rate equivalent to a rise of water in said tower means of between five inches per minute and ten inches per minute.

* * * * *